FRANKLIN A. HANSEN &
ROBERT S. COFFMAN
INVENTORS

ID OFFICE 2,954,897
Patented Oct. 4, 1960

2,954,897

SAFETY PRESSURE RELIEF DEVICE

Franklin A. Hansen and Robert S. Coffman, Kansas City, Mo., assignors to Black, Sivalls & Bryson, Inc., Kansas City, Mo., a corporation of Delaware Filed Feb. 15, 1956, Ser. No. 565,672

3 Claims. (Cl. 220—89)

The present invention relates generally to the field of safety pressure relief devices of the rupturable disc type. The invention relates more specifically with a particular type of safety pressure relief device which is provided with structure so that it is adaptable to be used between any type of flange.

Most safety pressure relief devices heretofore have required a special set of flanges for installation so that the rupture disc may be installed in a line without being subject to stress caused by installation and the consequent reduction of accuracy of rupture pressure of the unit. Those units which have been made with an outer flat surface to be received in a flange have not had any means by which they could be positioned and could therefore be installed improperly, changing the bursting pressure rating of the unit. Even if such unit were installed properly, the flange in which it was installed would have to be specially machined since it would present a sharp corner to the device as soon as the device was subject to pressure. Another feature about past safety pressure relief devices is that they required a special supporting member which was made to support the whole of the underside of the rupture member when installed and subject to a pressure up to one-half or more of its rated rupture pressure.

Therefore, the primary object of the present invention is to provide an improved safety pressure relief device which is adaptable for installation between ordinary pipe flanges, tube couplings, or unions without having to provide additional machining of the mating surfaces of the flanges.

A further important object of the present invention is to provide a safety pressure relief device of the rupturable disc type which includes the use of a dome-shaped member to determine the rupture pressure of the device and a flat supporting member to protect the unit from pressure reversals.

Further objects are to provide a universal type safety pressure relief device to be received in ordinary line flanges; to provide a safety pressure relief device which will position itself within flanges to prevent damage to the rupturable member; and to provide a safety pressure relief device in which the rupture pressure is not affected by minor changes in the diameter of the flanges in which it is installed.

In accomplishing these and other objects of the present invention we have provided apparatus illustrated in the accompanying drawing wherein.

Figure 1:
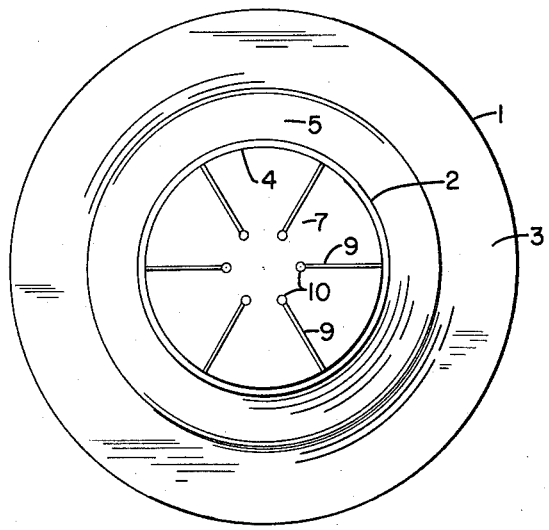
Fig. 1 is a plan view of a safety pressure relief device constructed in accordance with the present invention.
Figure 2:
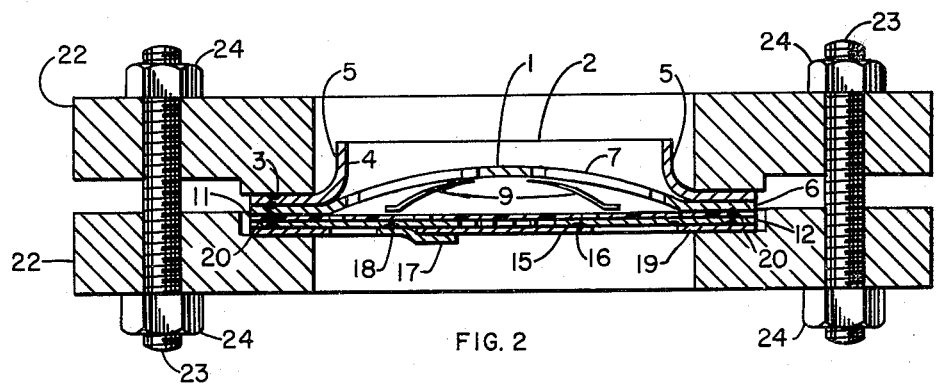
Fig. 2 is a sectional view of the device shown in Fig. 1 in an operating position between ordinary flanges.
Figure 3:
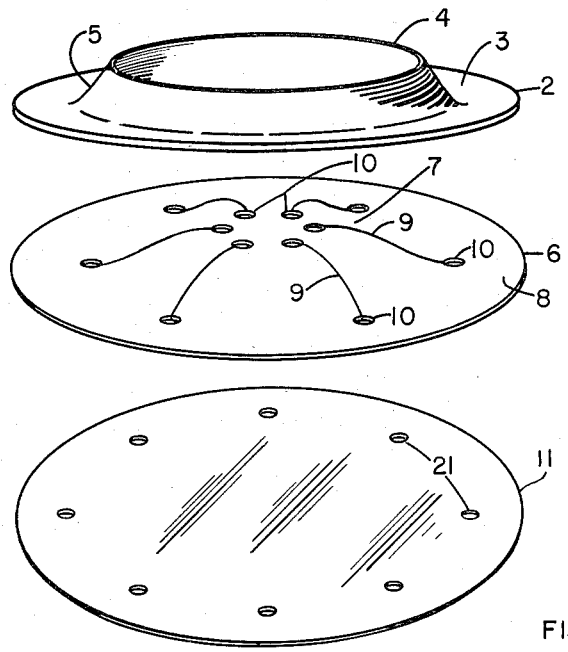
Fig. 3 is a perspective view of the device of the present invention showing the parts in disassembled spaced relationship.
Figure 3:
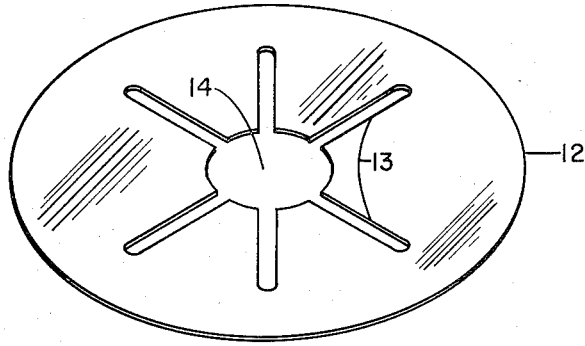
Figure 3:
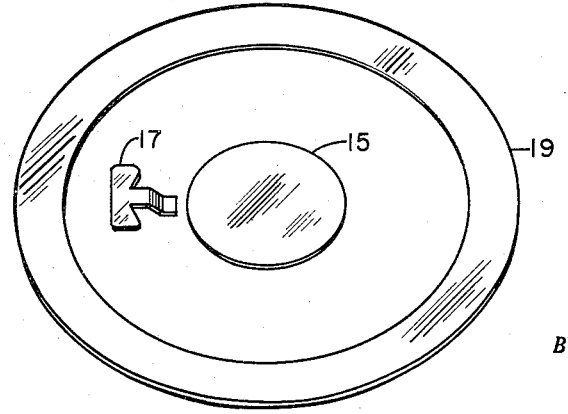

Safety pressure relief device generally designated 1 in Figs. 1 and 2 is composed of a plurality of members. Positioning member 2 is composed of a flat annular portion 3 and flange 4. Flange 4 extends upwardly and inwardly to provide tapered surface 5 which acts to position device 1.

Rupture member 6 comprises central dome shaped portion 7 and annular flange portion 8.

Portion 7 is provided with slots 9 radiating outwardly and terminating short of flange portion 8. For ease of manufacture and to avoid sharp corners on slots 9, holes 10 are provided at each of the extremities of each of slots 9.

Sealing member 11 is positioned between rupture member 6 and support member 12 and is usually made from a resilient material.

Support member 12 is flat and circular, having slots 13 radiating from central opening 14. Disc 15 is spot welded or otherwise suitably secured to support member 12 as shown at 16 in Fig. 2 in covering relation to central opening 14. Clip 17 is also spot welded or otherwise suitably secured to support member 12 as indicated at 18 at a position generally diametrically opposite to spot welding 16.

Seating member 19 is a flat annular ring and should be made of a material suitable for sealing between surfaces such as lead or other suitable gasketing material.

Members 2, 6, 11 and 12 are assembled by spot welds 20 around the outer flat peripheral surface or by other suitable securing means. A plurality of holes 21 in sealing member 11 are provided so that spot welds 20 will secure the metallic members 2, 6 and 12 together through holes 21.

Seating member 19 is secured to support member 12 by use of an adhesive. It should be noted that member 19 can be formed to extend up onto the upper side of flat annular portion 3 of positioning member 2 and thereby eliminate the necessity of using an adhesive to bind member 19 to the underside of support member 12.

The sectional view of Fig. 2 illustrates the safety pressure relief device 1 positioned between flanges or clamping rings 22. Studs 23 and nuts 24 retain flanges 22 in clamping engagement with device 1 there between. These flanges may be of any type which presents flat surfaces for clamping device 1. As shown in Fig. 2, a certain amount of misalignment may be tolerated in the positioning of device 1 between flanges 22. Thus, device 1 is designed to have a sufficiently large diameter to be positioned in rough forging or cast flanges having a variable inner diameter. With the use of an ordinary rupturable disc relief device this variance in diameter would cause a variance in the relieving pressure of the device. This is not the case in the present device since the diameter which determines the bursting pressure is set by the inner diameter of positioning member 2.

A novel feature of the present invention is the use of a flat vacuum support with a dome-shaped rupture disc. This is accomplished by the present invention by utilizing a resilient material for sealing member 11. The material used for sealing member 11 should have sufficient resilience to withstand repeated movement from contact with rupture member 6 to contact with support member 12 and return.

Even though sealing member 11 adds an appreciable amount of strength to device 1, the main variables for predetermining the rupture pressure of the unit are the thickness and material of rupture member 6, the proximity of holes 10 at the center of rupture member 6 and also the length of slots 9.

The device of the present invention has been found to be especially adaptable for installation on oil and gasoline railroad tank cars for use in protecting such cars from excess pressure. Often in such installations a device of the present invention can be installed in a vent line to prevent the loss of valuable vapors. In this latter instance, once the device has ruptured, the ordinary vent valve will operate to give pressure relief as needed and to prevent the loss of additional vapors. Ordinarily, a safety pressure relief device of the present type is designed to provide a fail safe mechanism to protect pressure vessels from excessive pressures which may occur for various reasons, one being the mulfunctioning of poppet or safety valves. Thus, care should be taken in installing the unit of the present invention in a vent line to assure the proper functioning of the vent valve.

It should be noted that member 2 may be made without flange 4 without departing from the scope of the present invention. In that type unit member 2 would not serve to position device 1 in flanges 22 but would serve by its reinforcement to set the diameter which determines the bursting pressure of device 1. Without its upstanding flange 4 the inner periphery of member 2 should be rounded on its lower corner so that it does not present a sharp corner to rupture member 6.

Thus as may be seen from the foregoing specification, we have provided a novel safety pressure relief device as set out in the objects herein.

What we claim and desire to secure by Letters Patent is:

1. A safety pressure relief device comprising, a dome-shaped rupture member which is of sufficient strength to rupture at a predetermined pressure, a flat support member and a resilient sealing member positioned between said rupture member and said support member, wherein said support member comprises a flat circular plate having slots radiating outwardly from a central opening and terminating short of the outer periphery to form a plurality of sector-shaped tongues, a disc member positioned under said central opening and secured to the inner portion of one of said tongues and a clip member overlapping said disc member and secured in said position to one of said tongues opposite to that one to which said disc member is secured.

2. A safety pressure relief device comprising, a dome-shaped rupture member which is of a thickness that will rupture at a predetermined pressure, a flat support member and a resilient sealing member positioned between said rupture member and said support member, wherein said support member comprises a flat circular plate having slots radiating outwardly from a central opening and terminating short of the outer periphery to form a plurality of sector-shaped tongues, a disc member positioned under said central opening and secured to the inner portion of one of said tongues and a clip member overlapping said disc member and secured in said position to one of said tongues opposite to that one to which said disc member is secured.

3. A safety pressure relief device adapted to be positioned across a relieving passageway and retained in such position between a pair of clamping rings surrounding said passageway and having opposed, flat annular clamping surfaces, said device comprising, a rupturable member which is of sufficient strength to rupture at a predetermined pressure, said rupturable member having a flat outer annular rigid flange portion and a central concavo-convex rupture portion, and a rigid positioning member, said positioning member having a flat outer annular flange portion secured to said flat outer flange portion of said rupturable member on the convex side thereof, said positioning member also having a central upstanding frustro-conical positioning portion encircling said concavo-convex rupture portion, said flat outer annular portions of said rupturable member and said positioning member being adapted to be clamped between said ring surfaces, and said central upstanding frustro-conical positioning portion of said positioning member being adapted to contact the inner edge of one of said ring surfaces to center said rupturable member properly within said relieving passageway.

References Cited in the file of this patent

UNITED STATES PATENTS

| | | |
|---|---|---|
| 2,178,178 | McKeever | Oct. 31, 1939 |
| 2,198,988 | Biniek | Apr. 30, 1940 |
| 2,224,748 | Sauer | Dec. 10, 1940 |
| 2,263,840 | Franck | Nov. 25, 1941 |
| 2,523,068 | Simpson | Sept. 19, 1950 |
| 2,548,744 | Jones | Apr. 10, 1951 |
| 2,758,749 | Simms | Aug. 14, 1956 |
| 2,766,904 | Philip | Oct. 16, 1956 |

FOREIGN PATENTS

| | | |
|---|---|---|
| 578,008 | Great Britain | June 12, 1946 |
| 851,152 | Germany | Oct. 2, 1952 |